United States Patent [19]

Keba

[11] Patent Number: 4,754,984
[45] Date of Patent: Jul. 5, 1988

[54] DUAL-SEAL-RING SHAFT SEAL

[75] Inventor: John E. Keba, Agoura, Calif.

[73] Assignee: The United States of America as represented by the Secretary of the Navy, Washington, D.C.

[21] Appl. No.: 20

[22] Filed: Jan. 2, 1987

[51] Int. Cl.[4] .................. F16J 15/40; F16J 15/447
[52] U.S. Cl. ........................... 277/53; 277/59; 277/75; 277/83; 277/135
[58] Field of Search .................. 277/53–56, 277/59, 60, 65, 75, 76, 83, 94, 135–137, 173, 215

[56] References Cited

U.S. PATENT DOCUMENTS

| 2,643,141 | 6/1953 | Bryant | 277/56 X |
| 3,825,364 | 7/1974 | Halila et al. | 415/116 |
| 4,078,809 | 3/1978 | Garrick et al. | 277/1 |
| 4,099,727 | 7/1978 | Weiler | 277/3 |
| 4,257,735 | 3/1981 | Bradley et al. | 415/174 |
| 4,402,515 | 9/1983 | Malott | 277/24 |

FOREIGN PATENT DOCUMENTS

| 33909 | 10/1928 | France | 277/53 |
| 38404 | 2/1915 | Sweden | 277/53 |
| 193157 | 2/1923 | United Kingdom | 277/53 |
| 861808 | 9/1981 | U.S.S.R. | 277/53 |

Primary Examiner—Robert S. Ward
Attorney, Agent, or Firm—Robert F. Beers; Harvey A. David

[57] ABSTRACT

An intershaft seal device between inner and outer coaxial shafts of a multiple spool turbine is characterized by a primary seal ring and carrier assembly that is keyed for rotation with, and axial movement relative to, the outer shaft with the primary seal ring running between races mounted on the inner shaft. A secondary seal ring is disposed between a cylindrical portion of the primary seal ring carrier and a tubular flange extending coaxially from the outer shaft and effects a balance of axial forces resulting from pressure zones separated by the seal device.

6 Claims, 1 Drawing Sheet

DUAL-SEAL-RING SHAFT SEAL

BACKGROUND OF THE INVENTION

This invention relates to the field of dynamic sealing of a fluid or fluids between coaxial shafts that experience relative rotation between one another. More particularly the invention is directd to an improved seal applicable as an intershaft air-oil seal in counterrotating or coratating multiple spool gas turbine engines.

Among the features desired in a coaxial shaft seal for use in turbines are low drag, ability to maintain centering throughout a wide range of temperatures and rotational speeds, allowance for axial movements between the shafts withoout need for springs, and ability to achieve optimal control of net axial pressure forces acting on the sealing element or elements. Prior art seals have provided some of those features individually, or combinations of some at the expense of others.

SUMMARY OF THE INVENTION

With the foregoing in mind, it is an object of the invention to provide an improved seal suitable for use between relatively rotatable coaxial shafts in turbines or the like, and which combines most or all of the aforementioned desirable features or advantages.

Another object object of the invention is to provide a seal that is more reliable and effective in use, and yet is reasonable in costs of manufacture.

As still another object, the invention aims to accomplish the foregoing through the provision of an intershaft seal for use between a first or inner shaft and a second or outer shaft wherein first and second seal races are carried on the inner shaft and define a precise annular groove, and a seal ring running therein that forms part of an axially movable seal assembly that is constrained to rotate with the outer shaft and includes a ring carrier having a substantially cylindrical portion cooperating with a secondary seal also on the second shaft.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
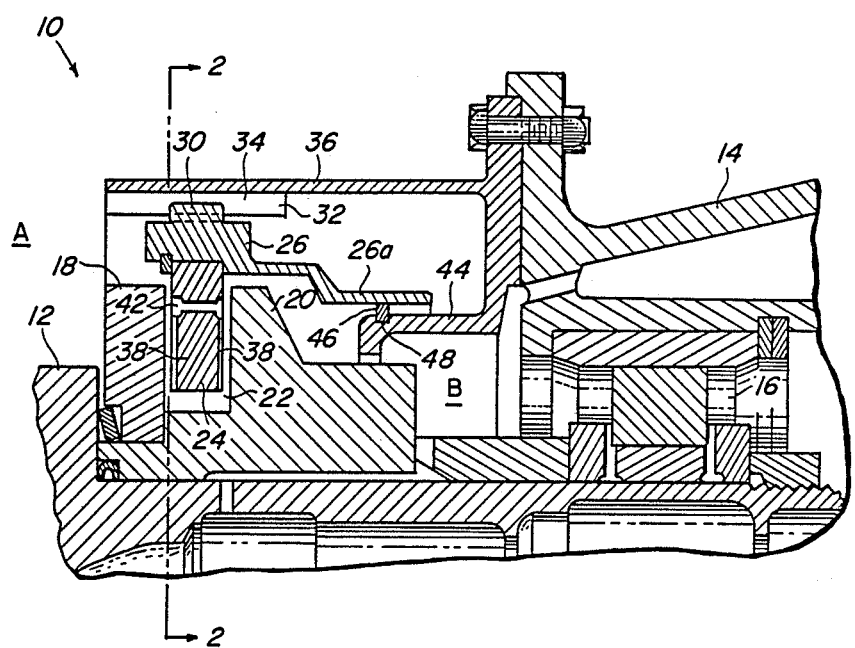
FIG. 1 is a fragmentary, longitudinal, sectional view of an improved intershaft seal according to this invention and shown in association with first and second relatively rotatable shafts of a turbine device.

In the exemplary form of the invention described herein, and with reference now to FIG. 1, an air-oil intershaft seal device is generally indicated at 10 and is shown in combination with a first or inner shaft 12 and a second or outer shaft 14 forming coaxial shafting of a counterrotating or corotating multiple spool turbine. The inner and outer shafts are supported for rotation relative to one another by bearing means including an intershaft bearing 16.

The seal device 10 comprises a seal race assembly mounted on the shaft 12 and comprising a first race 18 and a second race 20 defining therebetween an annular raceway or space 22. A primary seal ring 24 is adapted to run in the space 22 between the races 18 and 20 and is supported by a seal ring carrier 26. The primary seal ring 24 and its carrier 26 form a primary seal ring assembly that rotates with shaft 12. Thus, and with additional reference now to FIG. 2, the carrier 26 is generally tubular in form and is provided with three or more tabs or keys 30 equally spaced about the circumference and cooperating with inwardly directed ridges 32 defining keyways 34 in an axial flange member 36 that is fixed to the outer shaft.

Figure 2:
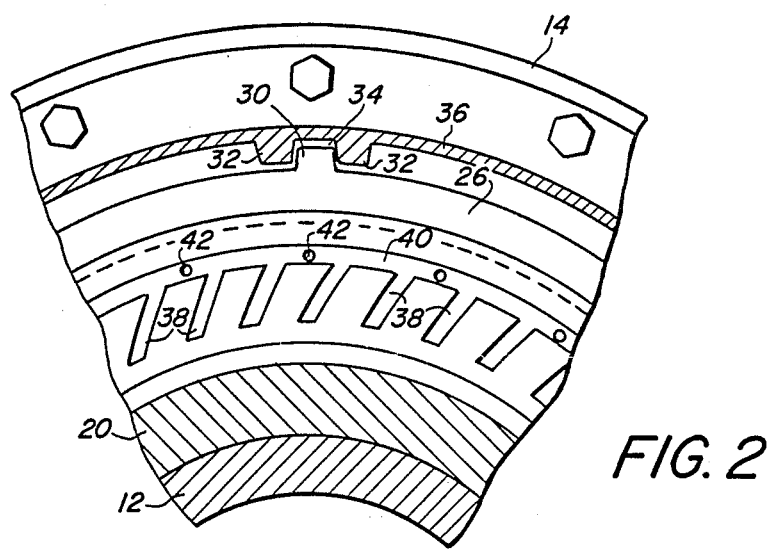
FIG. 2 is a fragmentary, transverse view taken substantially along line 2—2 of FIG. 1.

The keys and keyways not only serve as means for causing the seal assembly to rotate with the outer shaft, but also allow axial positioning of the carrier 26 and primary seal ring 24 so that the latter can seek a position of minimal rubbing and drag between the surfaces of the races 18 and 20. Further toward the latter end, and as is best seen in FIG. 2, the faces of the ring 24 are provided with arcuate grooves 38 the outer ends of which intersect with an annular groove 40 in each side of the ring, the grooves 40 being interconnected by vent holes 42 extending through the ring. The grooves 38, 40, and vent holes 42 cooperate to promote fluid bearing action between the primary seal ring 24 and the confining races 18 and 20.

The carrier 26 includes a cylindrical portion 26a that extends in telescoping relation around a tubular flange 44 extending axially from flange member 36 and rotatable with the second or outer shaft 14. A secondary seal ring 46, conveniently in the form of a piston ring, is fitted in a ring groove 48 on the flange 44 and sealingly engages the inner surface of the carrier cylindrical portion 26a. The secondary seal ring 46 accommodates any slight rotational and/or axial movements that occur between the primary ring seal assembly and the shaft 14.

It should be noted at this point that the seal device 10 serves to separate what may be regarded as a chamber A side from a chamber B side, and that the effective area of the seal device 10 that is responsive to pressures in those chambers is directly related to the outside diameter of the secondary seal ring 46 nd inner surface of the primry seal ring carrier portion 26a. Accordingly, that diameter may be optimally selected to effect a balance of axial forces acting on the seal device 10 so as to minimize closing or rubbing forces at the primary seal ring to race interfaces of the seal device.

It will be recognized that in other embodiments of the invention certain parts may be reversed while achieving the objects and advantage thereof. For example, the primary seal ring can be fixed on one of the shafts, i.e., the inner shaft, and the races located on the carrier.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. An intershaft seal device for effecting a seal between first and second coaxial, relatively rotatable shafts, said device comprising:
   first and second race means fixed on one of said first and second shafts in axilly spaced relation to define an annular raceway;
   a primary seal ring disposed in said raceway;

a carrier for said primary seal ring, sid carrier having a cylindrical portion;

means for causing said carrier and primary seal ring to rotate with the other of said first and second shafts while allowing axial movement of said primary seal ring relative to said first and second shafts;

a tubular flange extending from said other of said shafts into axially spaced coaxial relation with said cylindrical portion of said carrier; and a secondary seal ring disposed between said carrier cylindrical portion and said tubular flange, whereby small rotational and axial movements of said primary seal ring and said carrier relative to said shafts are accommodated.

2. An intershaft seal device as defined in claim 1, and wherein:

said first and second shafts are inner and outer shafts, respectively;

said first and second race means extending outwardly relative to said inner shaft;

said carrier being in surrounding relation to said race means, and said primary seal ring extending inwardly threfrom into said annular raceway; and said primary seal ring comprising means for promoting a fluid bearing effect between each of the faces thereof and the cooperating surfces of said race means.

3. An intershaft seal device as defined in claim 1, and wherein:

said tubular flange comprises a peripheral groove;

said secondary seal ring being seated in said peripheral groove and having its outer surface in engagement with said cylindrical portion of said carrier.

4. An intershaft seal device as defined in claim 3, and wherein:

said second seal ring has an outside diameter such that the axial pressure forces acting on said seal device are balanced and rubbing or closing forces at the primary seal ring are minimized.

5. An intershaft seal device as defined in claim 2, and wherein:

said tubular flange comprises a peripheral groove;

said secondary seal ring being seated in said peripheral groove and having its outer surface in engagement with said cylindrical portion of said carrier.

6. An intershaft seal device as defined in claim 5, and wherein:

said secondary seal ring has an outside diameter such that the axial pressure forces acting on said seal device are balanced and rubbing or closing forces at the primary seal ring are minimized.

* * * * *